(12) United States Patent
Wright et al.

(10) Patent No.: US 12,450,326 B2
(45) Date of Patent: Oct. 21, 2025

(54) APPARATUS FOR DEVICE CHARGING

(71) Applicant: IFPL Group Limited, Isle of Wight (GB)

(72) Inventors: John Michael Wright, Isle of Wight (GB); Geoff Underwood, Isle of Wight (GB)

(73) Assignee: IFPL GROUP LIMITED, Isle of Wight (GB)

( * ) Notice: Subject to any disclaimer, the term of this patent is extended or adjusted under 35 U.S.C. 154(b) by 804 days.

(21) Appl. No.: 16/968,260

(22) PCT Filed: Feb. 7, 2019

(86) PCT No.: PCT/GB2019/050337
§ 371 (c)(1),
(2) Date: Aug. 7, 2020

(87) PCT Pub. No.: WO2019/155219
PCT Pub. Date: Aug. 15, 2019

(65) Prior Publication Data
US 2021/0034731 A1    Feb. 4, 2021

(30) Foreign Application Priority Data
Feb. 7, 2018   (GB) .................................. 1802017

(51) Int. Cl.
*B64D 11/06*   (2006.01)
*G06F 21/35*   (2013.01)
(Continued)

(52) U.S. Cl.
CPC .......... *G06F 21/35* (2013.01); *B64D 11/0624* (2014.12); *H04B 5/79* (2024.01);
(Continued)

(58) Field of Classification Search
CPC .......... G06F 21/33; G06F 21/35; G06F 21/44; G06F 21/76; H04B 5/0037; H04B 5/0031;
(Continued)

(56) References Cited

U.S. PATENT DOCUMENTS 10,135,285 B2 * 11/2018 Ayotte .................. H02J 7/0013
2009/0249408 A1  10/2009 Smallhorn
(Continued)

FOREIGN PATENT DOCUMENTS

CN    101983467 A  *  3/2011  .......... H01M 10/425
EP    2106141           9/2009
(Continued)

OTHER PUBLICATIONS

"These Clothes Can Wirelessly Charge Your Phone"—Parija Kavilanz, CNN Business, Jun. 28, 2016 https://money.cnn.com/2016/06/28/technology/baubax-wireless-charging-clothing-kickstarter/ (Year: 2016).*

(Continued)

*Primary Examiner* — Randy A Scott
(74) *Attorney, Agent, or Firm* — Whiteford, Taylor & Preston, LLP; Peter J. Davis

(57) ABSTRACT

Apparatus for installation in a passenger transport vehicle for controlling a power charging outlet for a mobile electronic device (10), the apparatus comprising, a processor (5) and a switch (3), and the connector port (2), the switch arranged to control power supplied to the connector port and/or a data connection via the connector port, the processor configured to receive a signal indicative of a credential stored on a credential device, by way of a contactless terminal or by way of a wired connection between the device (Continued)

and the connector port, the processor arranged to verify or otherwise the validity of the received credential and control the switch accordingly.

4 Claims, 2 Drawing Sheets

(51) Int. Cl.
| | |
|---|---|
| *H04B 5/00* | (2024.01) |
| *H04B 5/79* | (2024.01) |
| *G06F 21/33* | (2013.01) |
| *G06F 21/44* | (2013.01) |
| *G06F 21/76* | (2013.01) |
| *H04B 5/24* | (2024.01) |

(52) U.S. Cl.
CPC .............. *G06F 21/33* (2013.01); *G06F 21/44* (2013.01); *G06F 21/76* (2013.01); *H04B 5/24* (2024.01)

(58) Field of Classification Search
CPC .............. H04B 5/0056; B64D 11/0624; B64D 11/0015; H02J 7/02
See application file for complete search history.

(56) References Cited

U.S. PATENT DOCUMENTS

| | | |
|---|---|---|
| 2014/0253021 A1 | 9/2014 | Luke et al. |
| 2015/0244424 A1* | 8/2015 | Sung ................... H02J 50/80 320/108 |
| 2015/0288217 A1 | 10/2015 | Mach et al. |
| 2015/0358052 A1* | 12/2015 | Muirhead ................ H04B 5/45 455/41.1 |
| 2016/0090192 A1 | 3/2016 | Dunn et al. |
| 2016/0336815 A1 | 11/2016 | Alperin et al. |
| 2018/0009446 A1* | 1/2018 | Ricci .................... H04W 12/04 |
| 2018/0012273 A1 | 1/2018 | Ricci |

FOREIGN PATENT DOCUMENTS

| | | | |
|---|---|---|---|
| EP | 2106141 A2 * | 9/2009 | ......... B64D 11/0015 |
| JP | H09212603 A | 8/1997 | |
| JP | 2005196664 A | 7/2005 | |
| KR | 101377570 B1 | 3/2014 | |

OTHER PUBLICATIONS

"In-Car Contactless Payments: The Next Generation of Mobile Commerce"—LISNR, Nov. 29, 2017 https://lisnr.com/resources/blog/in-car-contactless-payments-the-next-generation-of-mobile-commerce/ (Year: 2017).*

Intenrational Search Report issued in PCT/GB2019/050337 issued on May 8, 2019.

Search Report issued in UK Patent Application No. 1802017.2 issued on Jun. 28, 2018.

Chinese Office Action issued in co-pending application No. 2019800232071, dated Feb. 28, 2024.

* cited by examiner

APPARATUS FOR DEVICE CHARGING

TECHNICAL FIELD

The present invention relates to improvements concerning charging a battery of a portable electronic device.

BACKGROUND

Portable electronic devices require electrical power to operate. Mobile devices such as tablets, portable computers and mobile phones typically include a rechargeable battery that is recharged when the device is plugged into a socket capable of delivering power to the device. Rechargeable batteries must be charged from an external power source regularly to maintain battery life because rechargeable batteries discharge even when not used. The users of the mobile devices often suffer due to inaccessibility of electrical power for battery charging. In such a situation, the user must carry multiple batteries for continued operation of the mobile device or have access to an external power supply. Requiring a user to carry backup batteries not only incurs the expense of the additional battery but requires transport space and increased transport expense.

We have devised improved ways in which a passenger can conveniently re-charge his mobile device by way of a payment token which provides a credit for activating a power charging or data connection service or facility.

SUMMARY

According to the first aspect of the invention there is provided an apparatus for installation in a (public or mass) transport vehicle, for example a passenger cabin of an aircraft, or other transport method for controlling a connector port for a mobile electronic device, the apparatus comprising a processor and a switch, and the connector port, the switch arranged to control power supplied to the connector port and/or a data connection via the connector port, the processor configured to receive a signal indicative of a credential stored on a credential device, by way of a contactless terminal or by way of a wired connection between the device and the connector port, the processor arranged to verify or otherwise the validity of the received credential and control the switch accordingly.

The contactless terminal may comprise a wireless terminal, a Bluetooth terminal, or a Near Field Communication (NFC) terminal.

The terminal may be enabled to perform near field communication with a device or physical carrier which holds the credential.

By 'contactless' we include the meaning that the payment credential need not necessarily need to physically come into contact with the module in order for the terminal to obtain the credential data, and may require only that a device carrying the credential is brought into close proximity with a contactless terminal and includes 'wireless' communication of credential data over an air interface.

The credential device, which stores the credential, may comprise a chip, an RFI tag, an antenna, an inductive loop or a mobile telephone, for example.

The credential may comprise a token, a (unique) digital identifier or a code. The credential may be encoded or encrypted. The processor may be configured to perform public/private key methodology to ascertain the validity of the credential.

The credential may comprise a digital object.

The credential preferably comprises identifying data.

The credential may be viewed as a token which provides credit for a mobile device charging service. The credential may be described as a charging token.

The credential may be indicative of a credit value which allows multiple charging instances or charging service events.

The processor may be configured to process the credential to determine whether it corresponds to a valid credential.

The processor may provide intelligent functionality at the connector port, or be in communication with the connector port.

The processor may be arranged to cause a signal to be issued or output from the contactless reader to the device indicative of a credential having been successfully authenticated for charging of a device.

The connector port may comprise a socket. The connector port may comprise a USB socket. Generally, the connector port allows a counterpart connector (such as a plug) to be physically connected thereto, and provide an electrical signal connection. The connector port may comprise a power outlet. The connector port may comprise a number of electrical contacts or electrical terminals arranged to come into contact with a counterpart connector.

According to a second aspect of the invention there is provided a passenger vehicle, which comprises a passenger seat, a connector port for connection to a passenger device to be charged or to be connected to a data connection provide through the connector port, the connector port arranged at or in close proximity to the passenger seat, which is arranged to communicate with a credential device, a control apparatus for controlling a connector port, the control apparatus comprising a processor and a switch, the processor arranged to receive a credential from either a contactless terminal, provided at or in close proximity to the seat, or from an input signal received from a connected passenger device through the connector port, and the processor configured to determine the validity of the credential and control the switch for connecting a power supply or a data connection to the connector port accordingly.

The contactless terminal may be installed in an arm rest of a passenger seat. The contactless reader may be installed in a rearward part of a passenger seat.

According to a third aspect of the invention there is provided a software application for installation onto a user portable electronic device, and the application arranged to cause the device to be capable of receiving an input signal relating to a credential for activating a power charging facility or a data connection accessible through a connector port, the application configured to cause the credential to be stored in a memory of the device or for a credential to be capable of being generated by the application, and the application configured to cause the credential to be capable of being read by a contactless reader, or by a wired connection connecting the device to the connector port.

The application may be configured to make the credential (externally) accessible by way of an external communications interface of the device. The application may be arranged to cause the credential to be output via the external communications port of the device.

The application may be configured to output the credential to the contactless reader over an air interface, such as by Bluetooth® communications protocol.

The application may be arranged to update a (credit) value or balance associated with the credential stored on the device, for example when a user has used a credential for charging the device. The application may be arranged to process a signal received from a contactless terminal that a credential has been successfully authenticated.

The application may be arranged to cause the device to store multiple one-time use credentials or tokens.

The software application may comprise machine-readable instructions arranged to be executed by a processor of the mobile electronic device.

Any of the above aspects of the invention may include one or more features described in the description or shown in the drawings, either individually or in combination.

BRIEF DESCRIPTION OF THE DRAWINGS

Various embodiments of the invention will now be described, by way of example only, with reference to the following drawings in which.

DETAILED DESCRIPTION

There now follows a description of various implementations of arrangements for permitting a credential to be verified in order for a power supply to be provided for charging a user's electronic device, such as a mobile telephone or portable computer. In the implementations below, the invention is applied in the context of an aircraft cabin, providing passengers with the facility of a device charging service. However, it will be appreciated that 'passenger aircraft' could be replaced more generally with passenger transport vehicle, such as trains, coaches, ships etc.

Figure 1:
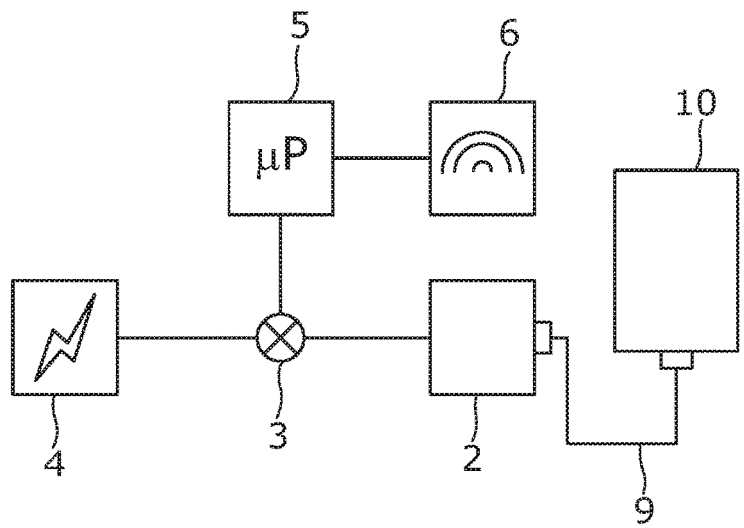
FIG. 1 is a block diagram of the principle functional components of a device charging system.

Reference is first made to FIG. 1 which shows a block diagram of the principle modules and sub-assemblies of a passenger device charging system. The system comprises a socket 2, a switch 3, a power source 4, a processor 5 and a contactless terminal 6.

The socket 2 is a USB-type socket (although other socket types could be used whilst still implementing the invention) which is arranged to receive a counterpart plug or connector, which in turn is connected to a passenger's device, and thereby provide charging power to re-charge the power stored in the battery of the device.

The socket 2 is connected to the power supply 4 via a switch 3. The power supply is that which is provided onboard the aircraft (and deriving its power from the aircraft's engines), and is modulated and regulated by suitable power control and distribution circuitry and sub-assemblies (such as an inverter).

The switch 3 is controlled by the processor 5. The processor 5 is provided with instructions (either as software or firmware) to determine the operative state of the switch i.e. whether to allow the socket to be provided with power or not, and other criteria such as for how long and under what conditions.

The processor 5 is connected to the contactless terminal 6, and is arranged to receive and process credential data from a device presented by the user to the terminal 6. It will be appreciated that the processor 6 may be provided as an integral part of the terminal 6, and as such may be viewed as providing the terminal with intelligent functionality.

The contactless terminal 6 comprises an aerial in the form of an inductive loop. The terminal is located in the proximity of the passenger, such as in an armrest, or in portion (such as a cut-out) of the rearward part of the seat or in a bulkhead in front of the passenger. In broad terms, the terminal 6 is located in an accessible position for the passenger. The contactless terminal 6 may be a Near Field Communication (NFC) device. The terminal 6 may be embodied as an integrated sub-assembly within a DC-DC converter architecture.

Figure 2:
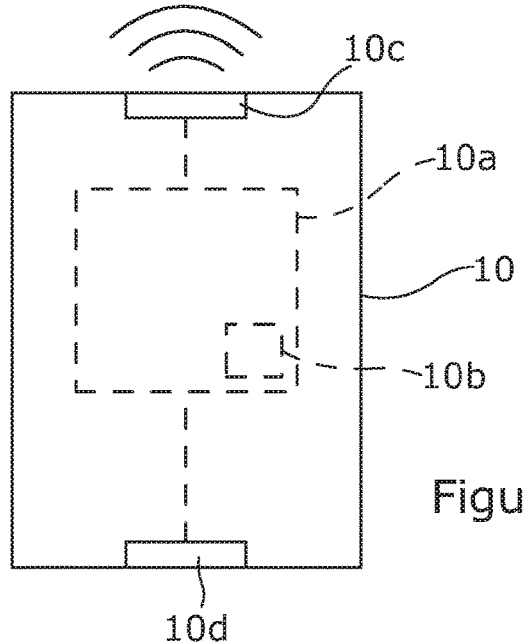
FIG. 2 is a block diagram of a mobile device which comprises a software application to enable use of the device charging system of FIG. 1.

The contactless terminal 6 is arranged to read credential data from a credential carrying device brought into close proximity with the terminal. In one implementation, the passenger device is a smartphone which has loaded onto its memory a software application. Reference is now made to FIG. 2 which shows a mobile telephone 10 which includes a software application 10a, such as in form an App, a stored credential 10b in the form of a digital object or token, an interface 10c for contactless communication of the credential to the contactless terminal, and a port 10d for connection to a cable for receiving a charging power supply externally.

The software application 10a contains instructions which manage the device charging service and controls communication of credential data for enabling the user to use the device charging service shown in FIG. 1.

The interface 10c may comprise an aerial or inductive loop which can be suitably energised under the control of the application 10a. However, the credential may alternatively be transmitted in a contactless or wireless manner by way of the interface 10c being a Bluetooth® transceiver (and in which instance the contactless terminal would be or include a Bluetooth® reader).

The software application 10a, in use, either stores or generates a credential, which can be read by the terminal 6. The processor 5 is configured to process the received credential to determine whether the credential is valid or invalid to activate power being supplied to the socket or power outlet 2 by controlling the switch 3. The application 10a may store a number of credentials, or a credential which has a particular credit value, to thereby enable a user to use the charging facility multiple times. The application 10a is such that on the input of a user to the device open and activate the application, the application will cause credential data to be presented or transmitted to the contactless interface 10c. If the contactless terminal is capable of bidirectional communication, then on the processor 5 determining that a valid credential has been received, a signal is output from the terminal 6 to the passenger device 10 accordingly. The application 10a is then configured to log this by deleting, or marking the credential as 'spent' or used, or deducting a credit value associated with (the 'allowance' of) the credential. For example, this may result in a message being displayed on the screen of the device of 'THREE CHARGING CREDITS REMAINING', or similar.

The processor 5 may be connected or have access to a database of valid charging credentials, each or a group of which is unique to each passenger. The processor can then update the database to show that a particular credential has been used and is no longer valid, or that an available credit value associated with a credential has been reduced as a result of its use.

The processor 5 may be configured to implement decryption processes for validating an (encrypted) credential in order to activate a power supply.

Whilst the device may store, in its memory, one or more credentials, for presentation to the contactless terminal 6, alternatively, the application 10a may be configured to generate a one-time or multiple use credential. The application may generate a code that may have a maximum usage allowance, e.g. 1, 10, 20 uses.

However, it will be appreciated that in some circumstances, the use of the software application is not required in order for a passenger to enable the charging facility. For example, the passenger or a crew member may be provided with a card (such as the size of a credit card) which includes an inductively readable credential (such as that used for enabling contactless payment for bank and credit cards at electronic points of sale (ePos)). In the case of a passenger, he could purchase or be given such a card during or prior to the flight. In this case, the credential stored on the card may have a single use credit, or multiple use credits. In order words, the credential for validating use of the charging service need not necessarily be through the credential being stored and delivered by the device to be charged.

In the case of crew or staffs capability to activate a charging service for a passenger, this could be by way of a 'master key' credential, embodied by a software application on a device authorised for use by staff/crew, or as a (passive) card or a USB 'dongle' (i.e. including a solid-state memory device which stores a valid credential) and a (physical) connector part to be received in electrical connection by the socket. This may also be term a memory 'stick' or a flash drive. This allows passengers who have not made the purchase of charging token pre-flight to pay the cabin crew for activation during flight. Use of the dongle could be particular use when no provision of a contactless terminal to which present the credential.

Figure 4:
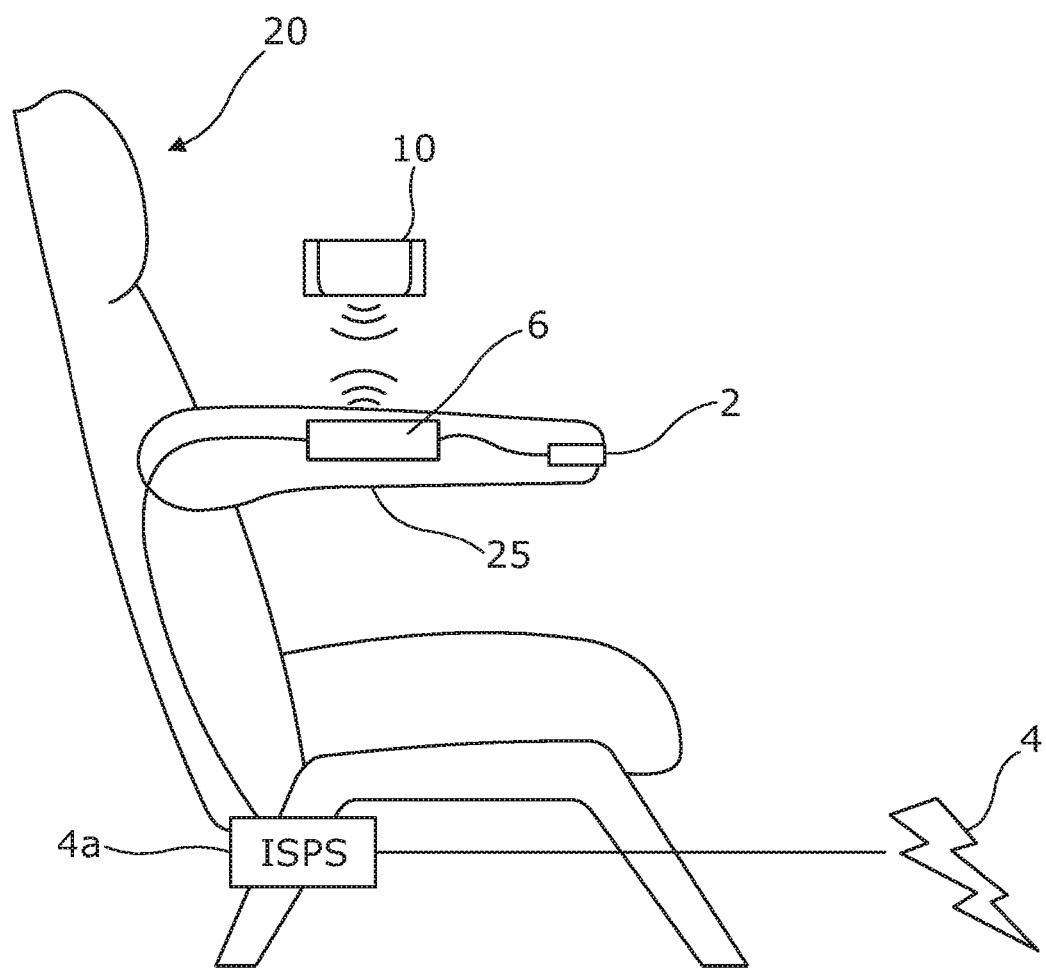
FIG. 4 is a schematic diagram of an aircraft passenger seat in which the device charging system of FIG. 1 has been implemented.

Reference is made to FIG. 4 which shows how the arrangement of FIG. 1 could be implemented into a passenger seat 20. The USB power charging socket 2 and the contactless terminal 6 are conveniently provided in the armrest 25 of the seat 20. FIG. 4a also shows an in-seat power system (ISPS) unit, 4a, which regulates power supply for passenger at-seat use. In the view shown in FIG. 4, the passenger device 10 is presented to the contactless terminal 6 in order to use a charging token stored on or generated by the application 10a. The passenger can then connect the device 10 to the USB charging socket 2 by way of a cable (shown as 9 in FIG. 1).

Figure 3:
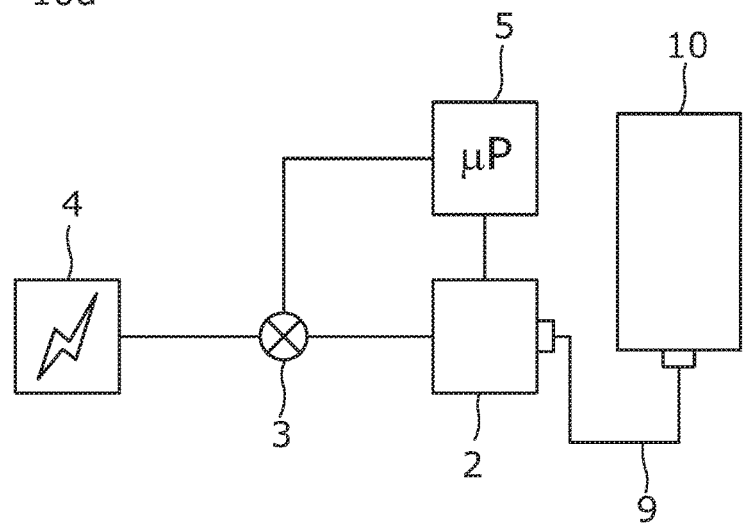
FIG. 3 is a block diagram of the principle functional components of a second implementation of a device charging system.

Reference is now made to FIG. 3, which shows an alternative implementation. In FIG. 3, the same reference numerals are used to denote the same or very similar elements. In this implementation, the use of a contactless reader is omitted. Instead, the system requires that a credential is stored or generated on the passenger device, which is transmitted to the power outlet 2 through a cable connection 9. The processor 5, which is connected to the socket 2, is configured to then determine whether the credential is a valid one which can be used to activate the power supply to the socket. Therefore, the use of the contactless terminal can be omitted.

When the device 10 is connected to the USB socket 2, the processor 6 and the device 10 communicate in some manner according to a communication protocol which is established. On an input from the user (or automatically), a signal would be output from the device 10 via the port 10d to the processor 6. This comms exchange would include the application 10a causing the credential to be sent from the device 10 to the processor 6. The processor can then determine whether the credential which is received is a valid one. If so, the processor can cause a signal or message to be sent back to the device 10, which causes the application to log that the credential has been used, and for example effect an internal update which reduces the number of credentials now available for future use. Alternatively, the charging process could be performed automatically, wherein when the cable is plugged in which connects the device 10 to the socket 2, a comms link is automatically established by the application recognising the socket in some way, such that the available credential can be verified and the charging commenced all in an automated way without any, or substantially no, user intervention. In this implementation, the socket 2 could be described as a smart or intelligent socket.

Advantageously, the application 10 may be an airline's authorised App, which for example allows customers to book flights, and view details of flights booked, to incorporate the charging token functionality. The application may allow passengers to purchase tokens pre-flight, or be given tokens when a flight is booked. The software application Passengers are able to purchase USB power pre-flight. Via an App or upon booking. Passengers are also to purchase USB power in flight via the flight attendant.

Although the above description has focused on a token-based system for passengers to use a device charging facility through a (USB) socket, in addition or alternatively, such a token based credential system could be used to allow passengers access to a data connection, such as a connection to a data network such as the internet, or an intranet, through the wired physical connection provided by the (USB) socket.

The invention claimed is:
1. A system comprising
a mobile electronic device power charging outlet for installation in a passenger seat of a passenger transport vehicle, and a software application for a mobile electronic device, the power charging outlet comprising a control apparatus controlling a connector port of the power charging outlet, the connector port comprising a socket for connection to the mobile electronic device by a counterpart connector, the control apparatus comprising, a processor, a non-transient memory, a switch, and the connector port, the switch configured to control power supplied to the mobile electronic device via the connector port and control a data connection to the mobile electronic device via the connector port, the processor configured to receive from the software application on the mobile electronic device, a signal indicative of a credential stored on the mobile electronic device, by way of a contactless terminal or by way of a wired connection between the device and the connector port, the processor configured to verify the validity of the received credential and control the switch accordingly;
wherein the processor is provided with instructions, stored on said non-transient memory, to determine the operative state of the switch, including determining whether to allow the socket to be provided with power, for how long, and under what operational conditions the power is provided to the mobile electronic device; and
wherein the mobile electronic device is at least one of a tablet, a portable computer and a mobile telephone, and further wherein the software application is configured to generate the credential and to update a credential credit value or credential balance upon use of a credential for charging.

2. The power charging outlet as claimed in claim 1, in which the terminal is enabled to perform near field communication with a device or physical carrier which holds the credential.

3. The power charging outlet as claimed in claim 1, in which the credential is a charging token.

4. The power charging outlet as claimed in claim 1, in which the processor is configured to process the credential to determine whether it corresponds to a valid credential.

* * * * *